United States Patent
Dabral et al.

(10) Patent No.: US 6,453,422 B1
(45) Date of Patent: Sep. 17, 2002

(54) REFERENCE VOLTAGE DISTRIBUTION FOR MULTILOAD I/O SYSTEMS

(75) Inventors: Sanjay Dabral, Milpitas, CA (US); Stephen R. Mooney, Beaverton; T. Zale Schoenborn, Portland, both of OR (US); Sam E. Calvin, Phoenix, AZ (US); Tim Frodsham, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,686

(22) Filed: Dec. 23, 1999

(51) Int. Cl.[7] .............................. G06F 1/26; G06F 1/28; G06F 1/32

(52) U.S. Cl. .................. 713/300; 710/100; 307/147; 375/257; 379/90; 327/537; 327/538; 327/546

(58) Field of Search ................................ 710/100, 101; 713/300–340; 307/147; 375/257; 379/90; 327/546, 537, 538

(56) References Cited

U.S. PATENT DOCUMENTS

| | | | | |
|---|---|---|---|---|
| 5,023,488 A | * | 6/1991 | Gunning | 326/86 |
| 5,247,209 A | | 9/1993 | Cheng | 307/296.5 |
| 5,355,391 A | * | 10/1994 | Horowitz et al. | 375/257 |
| 5,371,424 A | * | 12/1994 | Quigley et al. | 326/63 |
| 5,483,110 A | * | 1/1996 | Koide et al. | 307/147 |

* cited by examiner

Primary Examiner—Rupal Dharia
(74) Attorney, Agent, or Firm—Kenyon & Kenyon

(57) ABSTRACT

According to an embodiment of the invention a circuit that is to be coupled to a reference voltage line. The circuit includes a noise coupling circuit that is to couple noise from the circuit to a reference voltage line based upon whether a driver is driving a data line.

35 Claims, 7 Drawing Sheets

US 6,453,422 B1

REFERENCE VOLTAGE DISTRIBUTION FOR MULTILOAD I/O SYSTEMS

FIELD OF THE INVENTION

The present invention pertains to the field of receivers. More particularly, the present invention pertains to reference voltage distribution for multiload input/output (i/o) systems.

BACKGROUND OF THE INVENTION

Determination of the state or logic level of a signal (high or low) in digital signaling requires the signal to be compared to a reference state. For example, the signal can be a voltage level, and it can be compared to a reference voltage to determine if the signal is high or low. Providing a reference voltage line which has a reference voltage that tracks noise in a manner similar to the data lines is helpful for achieving high data rates on today's high performance buses. Tracking allows common mode noise rejection at the receiver thereby improving the noise margin. If the reference voltage and the data voltages do not track the noise in a similar manner the amount of time needed for the data signal to clearly cross the reference voltage changes. The amount of time needed for the data signal to clearly cross the reference voltage can vary from one bit to another. However, the worst case time needed for the data signal to clearly cross the reference voltage is used to ensure reliable operation. When the worst case time needed for the data signal to cross the reference voltage increases, the frequency of the data signal has to decrease, making the bus operate at a relatively low data rate. Consequently, it is beneficial for the noise in the reference voltage and data lines to track each other. Tracking noise in both the reference voltage and data lines is commonly referred to as pseudo differential voltage reference (Vref) distribution.

Pseudo differential voltage reference distribution has been implemented for point-to-point complementary metal-oxide semiconductor (CMOS) systems. In point-to-point complementary metal-oxide semiconductor (CMOS) systems a first chip and a second chip both generate the reference voltage (s) and distribute the reference voltage(s) among each other. FIG. 1 illustrates a CMOS point-to-point network which has pseudo differential Vref distribution implemented in simultaneous bi-directional signaling technology (SBD). CMOS network 100 includes chip 110 and chip 120. Chip 110 and chip 120 are coupled by data line 115 and reference lines 130 and 140. Chip 110 generates a high reference voltage (Vhigh) and a low reference voltage (Vlow) which are driven unto reference lines 130 and 140, respectively. Chip 120 also generates a Vhigh and Vlow which are driven unto reference lines 130 and 140. Since both chips 110 and 120 continuously and simultaneously generate and distribute the reference voltages the reference voltages are generally well defined at all times.

Chip 110 includes driver 112, input line 111, multiplexer 113, receiver 114 and high voltage reference driver (high vref driver) 142, and low voltage reference driver (low vref driver) 144. Chip 120 includes driver 122, input line 121, multiplexer 123, receiver 124 and high voltage reference driver (high vref driver) 146, and low voltage reference driver (low vref driver) 146. Driver 112 drives a data signal received on input line 111 onto line 115. While driver 112 is driving the data signal onto line 115, reference voltage generators 142 and 144 are applying Vhigh and Vlow onto lines 130 and 140 and reference voltage generators 146 and 148 are also applying Vhigh and Vlow onto lines 130 and 140. In addition to driving the data signal onto line 115, driver 112 also couples noise to line 115. By generating Vhigh and Vlow at both chip 110 and 120 and applying Vhigh and Vlow to lines 130 and 140, noise in each chip is also coupled to the reference voltage lines 130 and 140. Since the output impedance of drivers 142 and 146 matches the impedance of drivers 112 and 122 and the lengths of lines 130 and 140 match the length of line 115 noise couples to lines 130, 140, and 115 substantially equally helping noise tracking and rejection at receivers 114 and 124.

Receiver 124 receives the signal on line 115 and the output of multiplexer 123. Multiplexer 123 either outputs Vhigh or Vlow depending on whether the outbound signal driven is high or low. Receiver compares the signal received on line 115 with the output multiplexer 123 and outputs a signal indicative of the logic level or state of the signal on line 115. Since noise in line 115 substantially tracks the noise in lines 130 and 140, the common mode noise can be rejected at the receiver, improving performance. Receiver 114 operates in a manner similar to receiver 124 and need not be described in greater detail here. While only one data line is shown in network 100, generally multiple data bits share a common Vref pair.

There are other bus technologies besides CMOS SBD technology, each of which has its advantages and which would benefit from pseudo differential voltage reference distribution. Examples of alternative bus technologies include: unidirectional, multi-load CMOS, or multi-load open drain (Gunning transistor logic (GTL)) signaling systems. Since tracking noise in both the reference voltage and data lines and minimizing drift in the reference voltage line(s) may have a beneficial effect on performance and noise margin, it is desirable to give the benefits of pseudo differential voltage reference distribution to unidirectional, multi-load CMOS, or Gunning transistor logic (GTL) signaling systems.

SUMMARY OF THE INVENTION

According to an embodiment of the invention a circuit that is to be coupled to a reference voltage line is described. The circuit includes a noise coupling circuit that is to couple noise from the circuit to a reference voltage line based upon whether a driver is driving a data line.

BRIEF DESCRIPTION OF THE DRAWINGS

The present invention is illustrated by way of example, and not limitation, in the figures of the accompanying drawings in which.

DETAILED DESCRIPTION

A method and apparatus for generating reference voltages and detecting signal levels is described. In the following description, for purposes of explanation, numerous specific details are set forth in order to provide a thorough understanding of the present invention. It will be evident, however, to one skilled in the art that the present invention may be practiced in any type of bus, especially digital buses, without these specific details. In other instances well known operations, functions and devices are not shown in order to avoid obscuring the invention. Repeated usage of the phrases "in one embodiment," "in an embodiment," "an alternative embodiment," or "an alternate embodiment" does not necessarily refer to the same embodiment, although it may.

Figure 1:
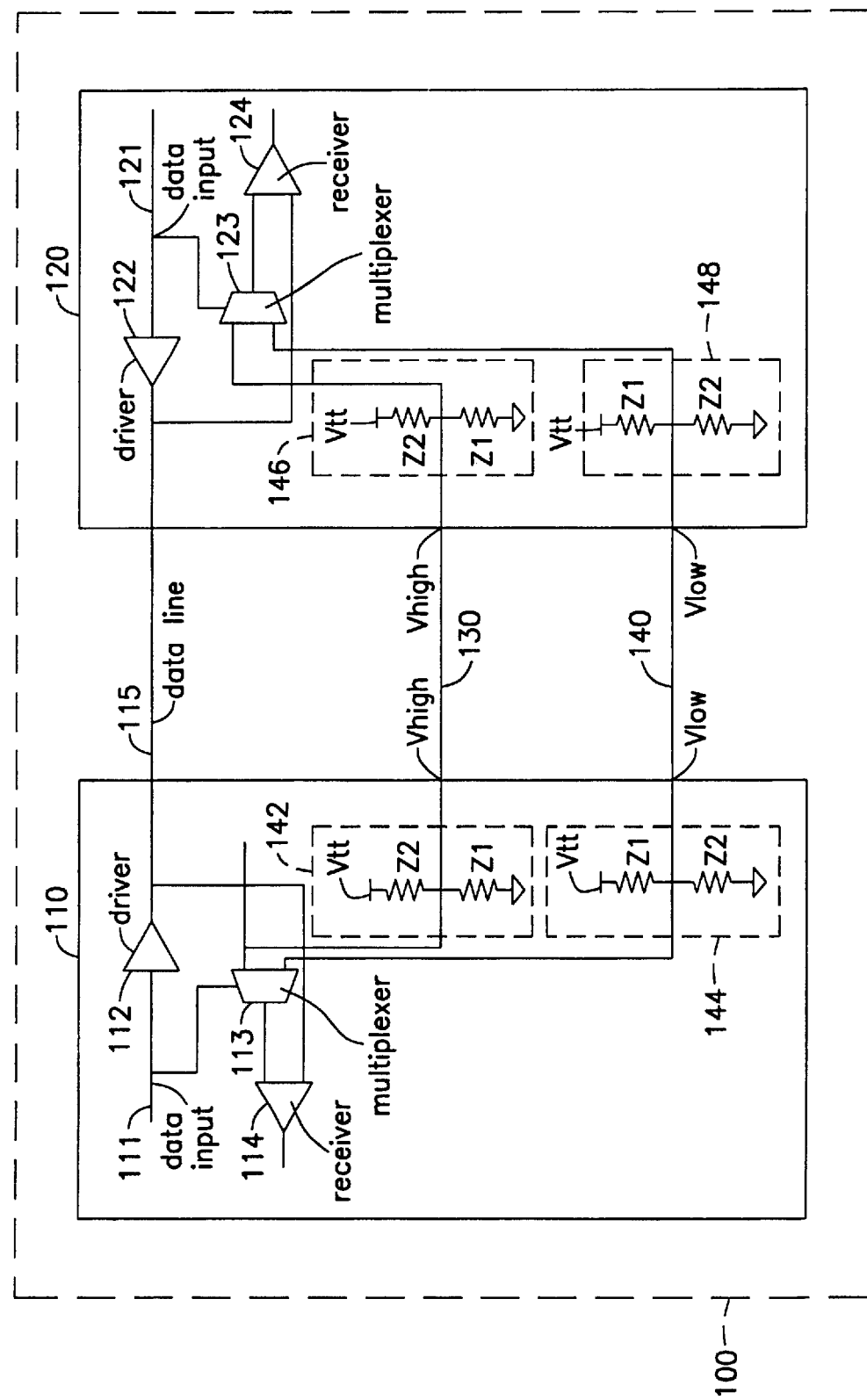
FIG. 1 illustrates a CMOS point-to-point network which has pseudo differential Vref distribution.
Figure 2:
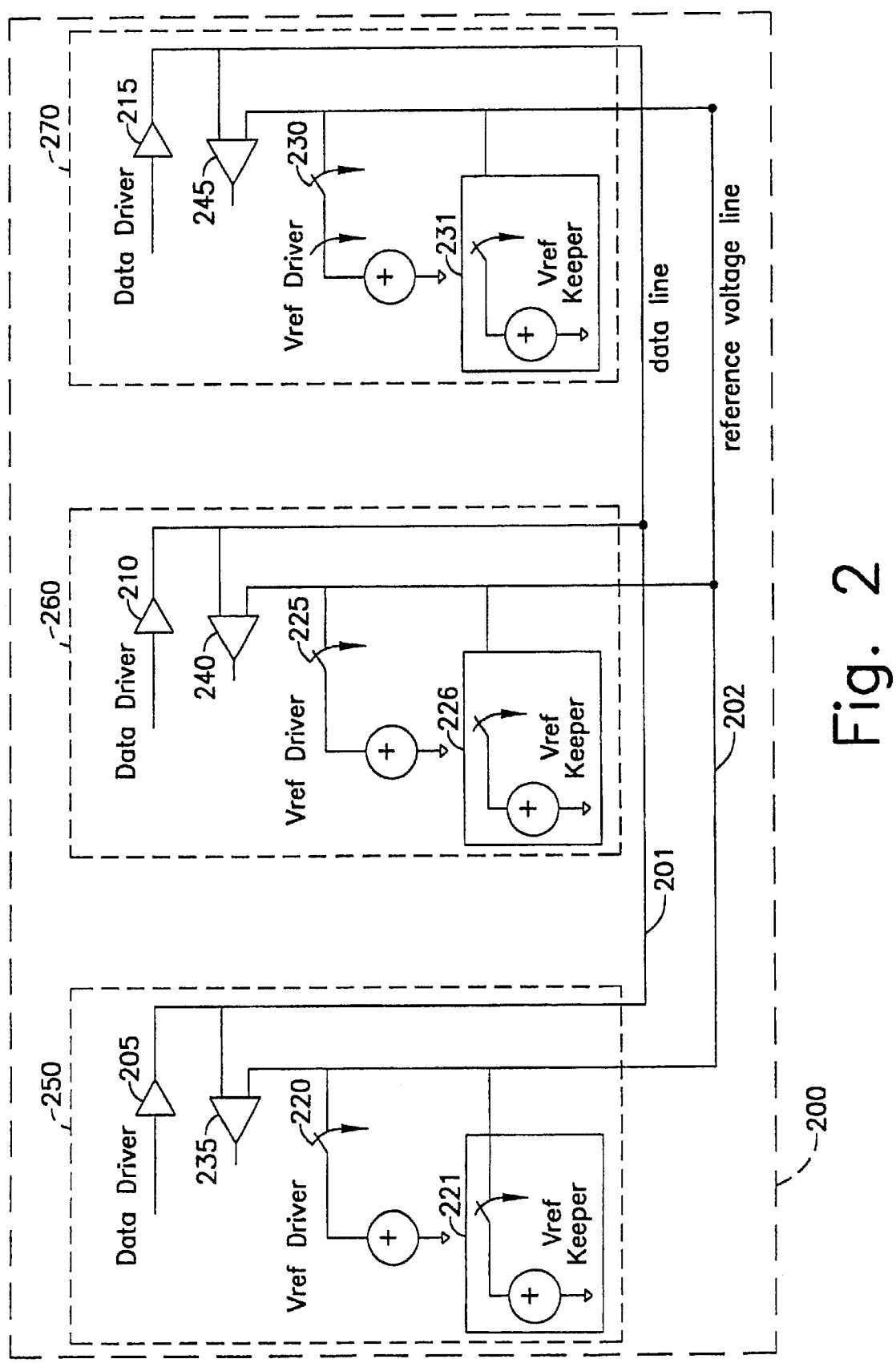
FIG. 2 illustrates a multi-load CMOS network for one embodiment in accordance with the present invention.

FIG. 2 illustrates a multi-load CMOS network for one embodiment in accordance with the present invention. Network 200 includes three separate integrated circuits 250, 260, and 270, each of which has a data driver, a receiver, a reference voltage driver, and a reference keeper. Integrated circuit 250 includes data driver 205, receiver 235, reference voltage driver 220, and reference keeper 221. Integrated circuit 260 includes data driver 210, receiver 240, reference voltage driver 225, and reference keeper 226. Integrated circuit 270 includes data driver 215, receiver 245, reference voltage driver 230, and reference keeper 231. Data driver 205 and reference voltage driver 220 are grouped together as a pair, and data driver 210 and reference voltage driver 225 are grouped together as a pair. Also, data driver 215 and reference voltage driver 230 are grouped together as a pair. When the data driver of a pair drives data line 201 the reference voltage driver of the pair also drives reference voltage line 202. For example, data driver 205 and reference voltage driver 220 drive lines 201 and 202, respectively, at the same time.

While the data driver of a chip/pair is driving the data line, the data driver allows noise to couple to the data line. The noise will affect the logic and voltage levels on the data line. Similarly, the reference voltage driver of the pair also permits noise to be coupled to the reference voltage line. Consequently, the noise on reference voltage line 202 substantially tracks the noise on data line 201. The tracking of the noise on lines 201 and 202 helps maintain the margins between the data line and the reference voltage line, allowing better timing and noise margin for some embodiments in accordance with the present invention.

In addition to tracking noise on the data line, it is desirable for the reference voltage line to maintain a predetermined reference voltage level. For one embodiment in accordance with the present invention, reference keepers 221, 226, and 231 drive reference line 202 so as to maintain a predetermined reference voltage level. Reference keepers 221, 226, and 231 prevent line 202 from drifting when none of drivers 220–230 are driving reference line 202 or when there is a changeover from one driver to another driver. Changeover form one driver to another driver is also referred to as master changeover. For one embodiment in accordance with the present invention, the reference keeper is a high impedance leaker which is sufficient to maintain reference voltages during changeover. For some embodiments, the reference voltage line(s) can be left floating for a few bus cycles because there is only a small leakage current during changeover. By maintaining the reference voltages even during changeover the benefits of pseudo differential voltage reference distribution can be realized in embodiments with multi-load networks.

While the above description of network 200 only included one data line and one reference voltage line, it should be appreciated that the scope and spirit of the present invention encompass alternative embodiments having different data line to reference voltage line ratios. For example, alternative embodiments may have two or more data lines for each reference voltage line. Additionally, alternative embodiments may have conventional discrete element circuits instead of integrated circuits coupled to the data line(s) and the reference voltage line(s).

For alternative embodiments, only one of the integrated circuits or discrete element circuits may have a reference keeper to maintain the reference voltage on the reference voltage line. Yet other alternative embodiments may have at least one external reference keeper which is separate from the integrated circuits or discrete element circuits. The external reference keeper is coupled to the reference voltage line and continuously drives the reference voltage line. Yet other alternative embodiments may have no external reference keeper. Rather, a reference keeper in an integrated circuit or a discrete element circuit will drive the reference line within a predetermined period of time after all drivers or bus agents stop driving the data line(s).

The above described changeover for CMOS systems for one embodiment according to the present invention. Parallel terminated networks such as open drain networks or Gunning transistor logic (GTL) networks present another issue. A parallel terminated network has resistors at each end of a reference voltage line and resistors at each end of the data line. In the case of the reference voltage line, the termination resistors serve the purpose of absorbing a bounce in the reference voltage signal to prevent reflections when the bounce reaches the end of the reference voltage line. In the case of the data line, the data line termination resistors serve the purpose of absorbing a signal that travels down the data line to prevent reflections. A parallel terminated network is preferable to a series terminated network because the intended logic level of a data signal is communicated to all receivers along the data line during the first pass of the signal down the line. In a series terminated network, on the other hand, the data signal has to travel to the end of the line and reflect back before a receiver along the line definitively recognizes the signal as being above the reference voltage. Unfortunately, the driver resistors can produce problems with unequal noise coupling to the data lines and the reference voltage line(s), creating problems with the margin between the data lines and the reference voltages. Part of the problem is due to the fact that these networks typically operate with a large pull down driver and a weak pull up driver, unlike the CMOS buffers where the drivers are substantially equal. Therefore, for one embodiment in accordance with the present invention, a parallel terminated bus driver's pull-up impedance (Rup) should be substantially equal to the driver's pull-down impedance (Rdn).

Figure 3:
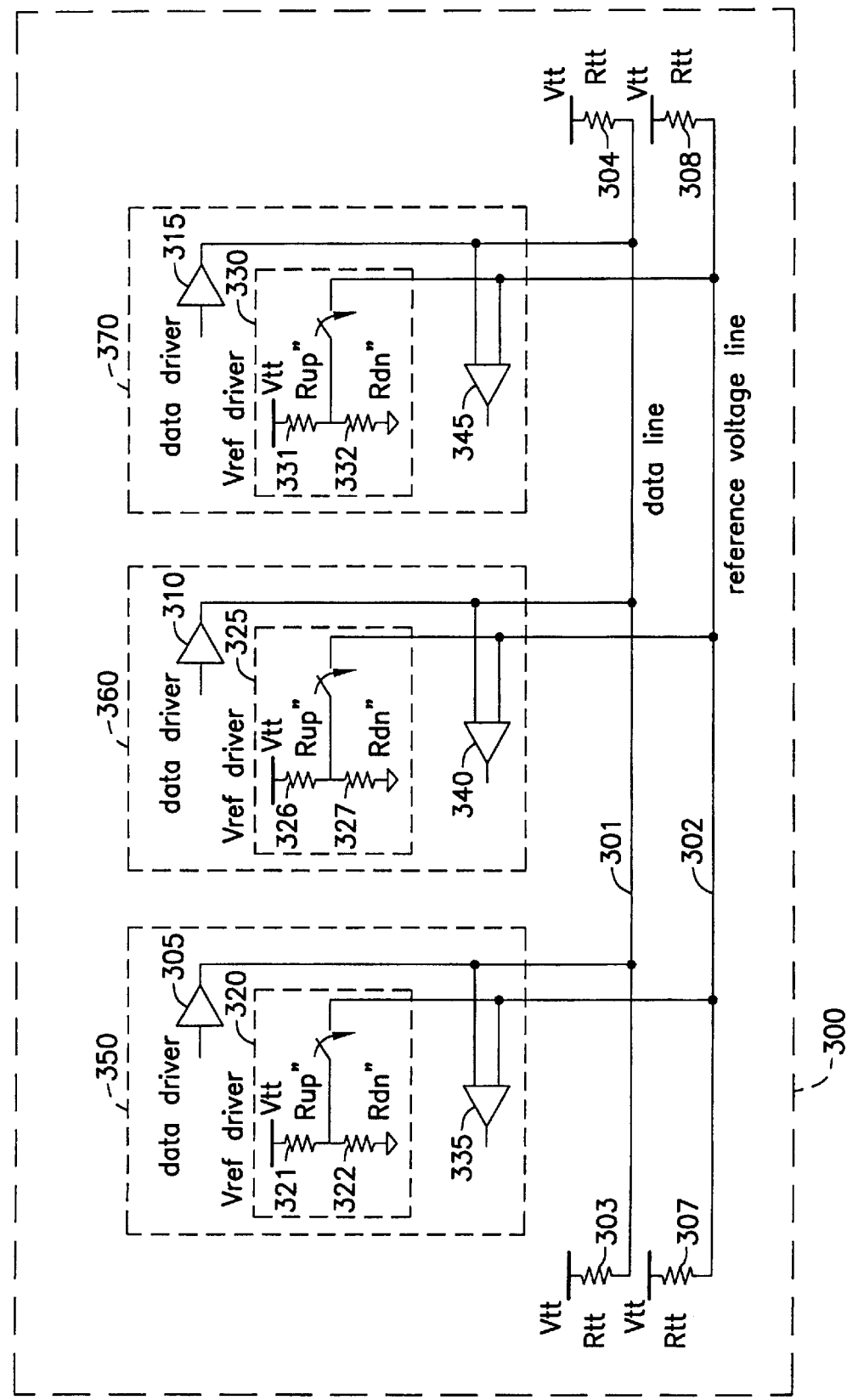
FIG. 3 illustrates a multi-load parallel terminated network for one embodiment in accordance with the present invention.

FIG. 3 illustrates a parallel terminated network for an embodiment in accordance with the present invention. Network 300 can be implemented with GTL technology. However, other bus technologies suitable for parallel terminated networks may also be used. Network 300 includes three separate integrated circuits 350, 360, and 370, each of which has a data driver, a receiver, and a reference voltage driver. Integrated circuit 350 includes data driver 305, receiver 335, and reference voltage driver 320. Integrated circuit 360 includes data driver 310, receiver 340, and reference voltage driver 325. Integrated circuit 370 includes data driver 315, receiver 345, and reference voltage driver 330. Data driver 305 and reference voltage driver 320 are grouped together as a pair, and data driver 310 and reference voltage driver 325 are grouped together as a pair. Also, data driver 315 and reference voltage driver 330 are grouped together as a pair. Network 300 also includes data line 301, reference voltage line 302, reference line termination 307–308, and data line termination resistors 303–304. When the data driver of a pair drives data line 301 the reference voltage driver of the pair also drives reference voltage line 302 with a reference voltage. The reference voltage driver of the pair also behaves as a noise coupling circuit by coupling noise in the integrated circuit to the reference voltage line.

While the above description of network 300 only included one data line and one reference voltage line, it should be appreciated that the scope and spirit of the present invention encompass alternative embodiments having different data line and reference voltage line ratios. For example, alternative embodiments may have two or more data lines for each reference voltage line. Additionally, alternative embodiments may have conventional discrete element circuits instead of integrated circuits coupled to the data line(s) and the reference voltage line(s).

Data driver 305 and reference driver 320 are paired together and drive lines 301 and 302, respectively, at the same time. According to one embodiment of the present invention, when a pair of a data driver and a reference voltage driver are driving lines 301 and 302, the remaining pairs do not drive the lines. A signal applied by a data driver onto line 301 travels the length of line 301. However, resistances 303 and 304 at the ends of the data line serve the purpose of absorbing a signal that travels down the data line to prevent reflections. Similarly, resistances 307–308 serve the same purpose of absorbing a noise bounce in the voltage reference signal on line 302, but they also allow the voltage reference line to be matched to the data line. Due to these termination resistances, network 300 is preferable to a series terminated network because the intended logic level of a data signal is communicated to all receivers along the data line during the first pass of the signal down the line. In a series terminated network, on the other hand, the data signal has to travel to the end of the line and reflect back before a receiver along the line definitively recognizes the signal as being above the reference voltage.

Receivers 335–345 compare the signal on lines 302 and 301 and generate a signal indicative of the logic level of the signal on line 301. The ability of receivers to properly decode the signal depends on network 300 providing a predetermined reference voltage (Vref) on line 302 as well as a common mode noise tracking between the reference voltage line and the data line. When Vref drifts or the lines 301 and 302 do not respond similarly to noise the timing at the receivers 335–345 can affect performance on the bus.

For one embodiment in accordance with the present invention, the reference voltage line is substantially similar to the data line so that noise couples substantially equally and in a similar manner to both lines. When the lines are substantially similar, the noise that couples to the reference line is substantially in phase with and has substantially equal magnitude to the noise on the data line. When the noise on the two lines is substantially equal in phase and magnitude, a predetermined margin between the data signal and the reference voltage can be maintained more easily which may lead to better signal recovery and improved performance, such as higher data rates on the data lines.

For the reference voltage and data lines to be substantially similar, in one embodiment the lines have substantially equivalent lengths and impedances. Furthermore, the termination resistors on each of the lines have substantially equivalent values. Also the data drivers and the reference voltage drivers have substantially equivalent impedances. Consequently, the material, length, and cross-sections, among other characteristics of lines 301 and 302 are substantially similar in one embodiment. Resistors 303 and 304 have substantially the same resistance, Rtt, as resistors 307 and 308. The impedance of each of reference voltage drivers 320–330 is substantially equal to the impedance of each of data drivers 305–315. For example, data drivers 305–315 have a pull-up impedance equal to Rup' (not shown) when a rising edge signal is being driven onto line 301 and a pull-down impedance equal to Rdn' (not shown) when a falling edge signal is being driven onto line 301. Typically, CMOS drivers and drivers used in GTL implementations do not have equivalent pull-up and pull-down impedances. Typical GTL implementation may only have a pull-down impedance because the driver only performs pull-down of a data line. However, drivers 305–315, in one embodiment, have substantially equal pull-up impedances, Rup', and pull-down impedances, Rdn'. Thus, the parallel combination of Rup" and Rdn" of each of drivers 320–330, in one embodiment, should be substantially equal to Rup' or Rdn' of drivers 305–315. For example Rup" 321 in parallel with Rdn" 322 should be substantially equal to Rup' or Rdn'. The relationship between Rup" and Rdn" and Rup' and Rdn' is described by the following expression:

$$R\text{up"}\|R\text{dn"} \approx R\text{up' or } R\text{dn'}$$

Furthermore, the relationship between the reference voltage, the resistances of a reference voltage driver and the reference termination resistors is described by the following expression:

$$V\text{ref} \approx V\text{tt}*R\text{dn"}/(R\text{dn"}+(R\text{up"}\|R\text{tt}\|R\text{tt})),$$

where Vtt is the voltage applied to the reference line termination resistors.

When a data driver and its associated reference voltage driver stop driving data line 301 and reference line 302, respectively, so that the next data and reference driver pair and can start driving data line 301 and reference line 302, respectively, reference voltage line 302 will float through unknown states as its voltage travels up towards Vtt and will encounter transients as the reference voltage driver formerly driving the bus releases the bus so that the next reference voltage driver can drive the bus. This may cause serious problems with the bus as signal logic levels can change leading to incorrect actions. It is helpful to avoiding Vref drift. In an alternative embodiment in accordance with the present invention, Vref does not drift substantially towards Vtt during changeover from one reference voltage driver to another reference voltage driver.

Figure 4:
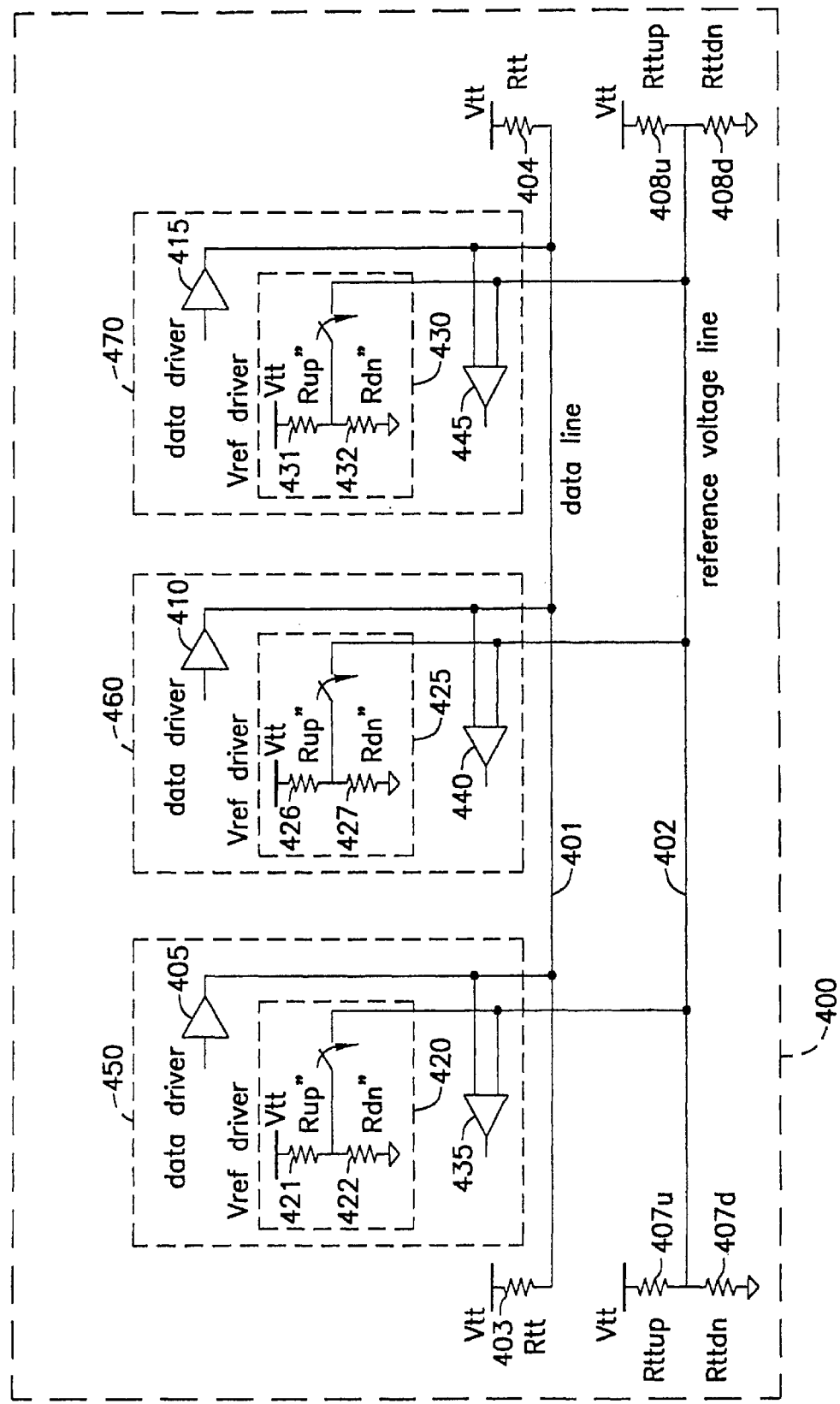
FIG. 4 illustrates a multi-load parallel terminated network for an alternative embodiment in accordance with the present invention.

For example, FIG. 4 illustrates a parallel terminated network in accordance with an alternative embodiment of the present invention. Network 400 includes three separate integrated circuits 450, 460, and 470, each of which has a data driver, a receiver, and a reference voltage driver. Integrated circuit 450 includes data driver 405, receiver 435, and reference voltage driver 420. Integrated circuit 460 includes data driver 410, receiver 440, and reference voltage driver 425. Integrated circuit 470 includes data driver 415, receiver 445, and reference voltage driver 430. Data driver 405 and reference voltage driver 420 are grouped together as a pair, and data driver 410 and reference voltage driver 425 are grouped together as a pair. Also, data driver 415 and reference voltage driver 430 are grouped together as a pair.

Network 400 also includes data line 401, reference voltage line 402, reference line termination up resistors 407u–408u, reference line termination down resistors 407d–408d, and data line termination up resistors 403–404. When the data driver of a pair drives data line 401 the reference voltage driver of the pair also drives reference voltage line 402 with a reference voltage. The reference voltage driver of the pair also behaves as a noise coupling circuit by coupling noise in the integrated circuit to the reference voltage line.

While the above description of network 400 only included one data line and one reference voltage line, it should be appreciated that the scope and spirit of the present invention encompass alternative embodiments having different data line and reference voltage line ratios. For example, alternative embodiments may have two or more data lines for each reference voltage line. Additionally, alternative embodiments may have conventional discrete element circuits instead of integrated circuits coupled to the data line(s) and the reference voltage line(s).

The three pairs of a data driver and a reference voltage driver operate in a manner similar to the driver pairs described in connection with network 300, and their operation need not be described further, here. According to one embodiment of the present invention, when a pair of a data driver and a reference voltage driver are driving lines 401 and 402, the remaining pairs do not drive the lines. In an alternative embodiment of the present invention, the two pairs may drives the lines simultaneously. A signal applied by a data driver onto line 401 travels the length of line 401. However, resistors 403 and 404 at the ends of the data line serve the purpose of absorbing a signal that travels down the data line to prevent reflections. Similarly, resistors 407u, 407d, 408u, and 408d serve the purpose of absorbing a noise bounce in the voltage reference signal on line 402 when the bounce reaches the end of a voltage reference line, in order to prevent reflections. Network 400 is preferable to a series terminated network because the intended logic level of a data signal is communicated to all receivers along the data line during the first pass of the signal down the data line.

Receivers 435–445 compare the signal on lines 402 and 401 and generate a signal indicative of the logic level of the signal on line 401. The ability of receivers to properly decode the signal depends on network 400 providing a predetermined reference voltage (Vref) on line 402 as well as common mode noise tracking between the data line and the reference voltage line. When Vref drifts or the lines 401 and 402 do not respond similarly to noise the timing at the receivers 435–445 can affect performance on the bus.

For one embodiment in accordance with the present invention, the reference voltage line is substantially similar to the data line so that noise couples substantially equally and in a similar manner to both lines. When the lines are substantially similar, the noise that couples to the reference line has a phase and magnitude that is substantially equal to that of the noise on the data line. When the noise on the two lines is in phase, a predetermined Margin between the data signal and the reference voltage can be maintained more easily which may lead to better signal recovery and improved performance, such as higher data rates on the lines.

For the lines to be substantially similar, in one embodiment the lines have substantially equivalent lengths and impedances, corresponding termination resistors with substantially equivalent values, and corresponding drivers attached to the lines with substantially equivalent impedances. Consequently, the material, length, and cross-sections, among other characteristics of lines 401 and 402 are substantially similar in one embodiment. Resistor 403 has substantially the same resistance, Rtt, as resistors 407u and 407d in parallel. Similarly, resistor 404 has substantially the same resistance, Rtt, as resistors 408u and 408d in parallel. The relationship between the termination resistors on lines 401 and 402 is described by the following expression:

$$Rtt\text{up} \| Rtt\text{dn} \approx Rtt$$

The impedance of each of reference voltage drivers 420–430 is substantially equal to the impedance of each of data drivers 405–415. For example, data drivers 405–415 have a pull-up impedance equal to Rup' when a rising edge signal is being driven onto line 401 and a pull-down impedance equal to Rdn' when a falling edge signal is being driven onto line 401. In one embodiment, Rup' is equal to Rdn'. Thus, the parallel combination of Rup" and Rdn" of each of drivers 420–430, in one embodiment, should be substantially equal to Rup' or Rdn' of drivers 405–415. For example, Rup" 421 in parallel with Rdn" 422 should be substantially equal to Rup' or Rdn'. The relationship between Rup" and Rdn", on the one hand, and Rup' and Rdn', on the other hand, is described by the following expression:

$$R\text{up}" \| R\text{dn}" \approx R\text{up}' \text{ or } R\text{dn}'$$

Also, the reference voltage at the output of a reference voltage driver is related to the voltage supplied to the reference voltage driver, Rup", and Rdn" is described by the following equation:

$$Vtt * Rdn" / (Rup" + Rdn") \approx Vref$$

Additionally, the value of the reference voltage on line 402 is related to the voltage (Vtt) applied to resistors 407u and 408u as described by the following expression:

$$(Vtt * Rtt\text{dn}) / (Rtt\text{up} + Rtt\text{dn}) \approx Vref$$

It should be appreciated that when none of the reference voltage drivers are driving line 402, line 402 will remain at Vref because of the voltage generated due to resistor pair 407u and 407d, and resistor pair 408u and 408d. While in one embodiment there is current flow through termination resistors in an alternate embodiment of the present invention there is less current flow through the termination resistors. In line 402 there is insubstantial DC current flow because the on-chip Vref generator and the termination resistor pair are all set to Vref. Therefore, if a Vref generator is switched off the Vref remains at the same DC level and does not drift.

Figure 5:
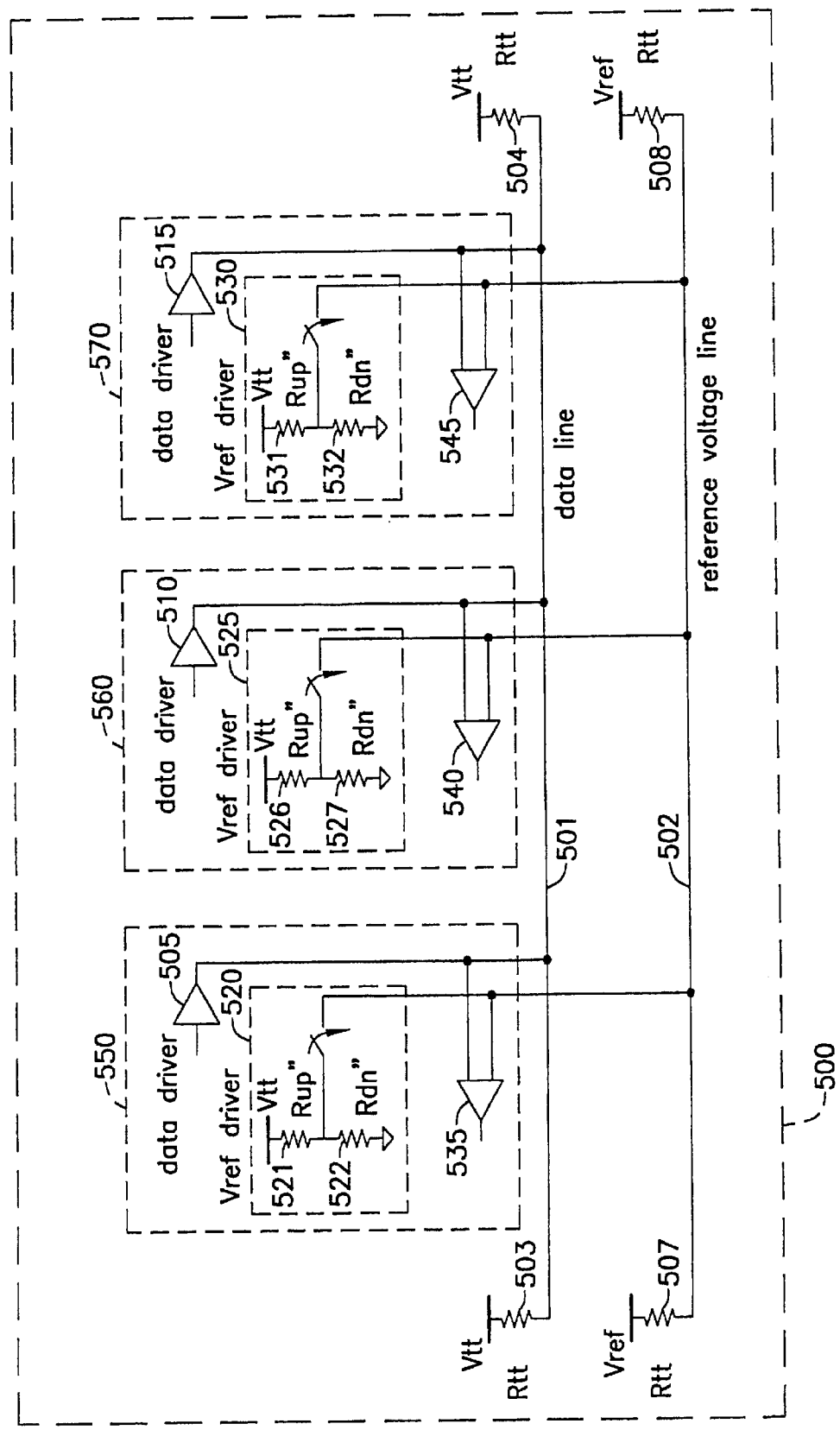
FIG. 5 illustrates a multi-load parallel terminated network for yet another embodiment in accordance with the present invention.

For example, FIG. 5 illustrates a parallel terminated network for an alternative embodiment in accordance with the present invention. Network 500 includes three separate integrated circuits 550, 560, and 570, each of which has a data driver, a receiver, and a reference voltage driver. Network 500 includes data drivers 505, 510, and 515, reference voltage drivers 520–530, data line 501, reference voltage line (reference line) 502, data line termination resistors 503 and 504, reference line termination resistors 507 and 508, and receivers 535–545. Network 500 operates and is made in a manner similar to network 400 and need not be described in greater detail, here. The reference voltage drivers behave as a noise coupling circuit by coupling noise in an integrated circuit to the reference voltage line Salient differences between network 500 and network 400 will now be described. For example, instead of applying a voltage greater than the reference voltage, Vref, to a termination resistor on line 502, a voltage substantial equal to Vref is applied to the termination resistors. By applying a voltage substantially equal to Vref to the termination resistors, line 502 will remain at Vref when none of the reference voltage drivers are driving line 502, providing a stable Vref. This may help where there are no drivers driving, or there is a master changeover. Additionally, there will be insubstantial DC current flow through the termination resistors, providing Vref in a relatively efficient manner.

While the above description of network 500 only included one data line and one reference voltage line, it should be appreciated that the scope and spirit of the present invention encompass alternative embodiments having different data line to reference voltage line ratios. For example, alternative embodiments may have two or more data lines for each reference voltage line. Additionally, alternative embodiments may have conventional discrete element circuits instead of integrated circuits coupled to the data line(s) and the reference voltage line(s).

Figure 6:
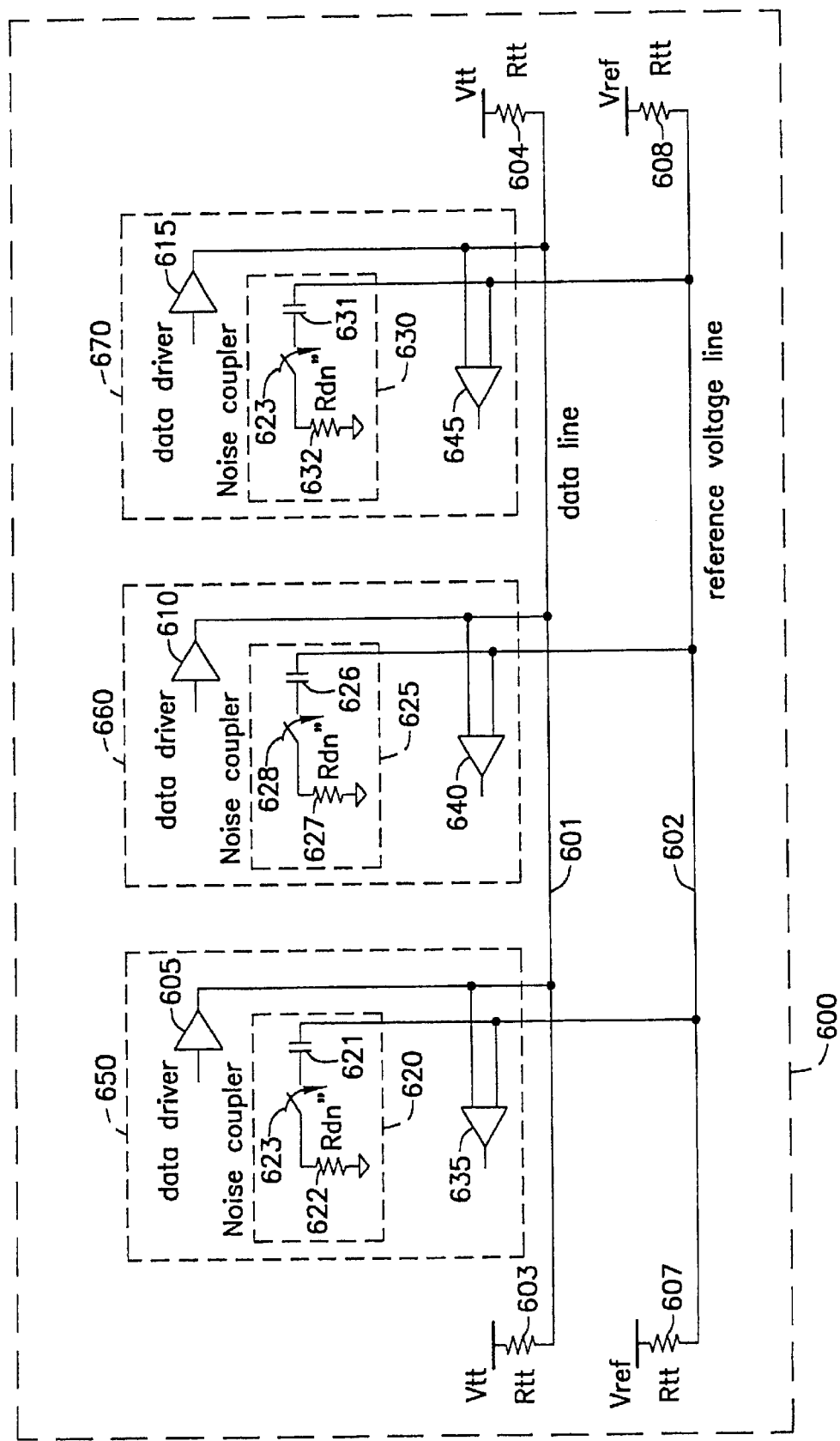
FIG. 6 illustrates a parallel terminated network for an alternative embodiment in accordance with the present invention.

FIG. 6 illustrates a parallel terminated network for an alternative embodiment in accordance with the present invention. Network 600 includes three separate integrated circuits 650, 660, and 670, each of which has a data driver, a receiver, and a noise coupling circuit. Network 600 includes data drivers 605, 610, and 615, noise coupling circuits 620–630, data line 601, reference voltage line (reference line) 602, data line termination resistors 603 and 604, reference line termination resistors 607 and 608, and receivers 635–545. Network 600 operates and is made in a manner similar to network 500 and need not be described in greater detail, here.

Salient differences between network 600 and network 500 will now be described. For example, instead of having reference voltage drivers that generate a reference voltage and couple noise from each integrated circuit to the reference voltage line, network 600 includes noise coupling circuits that couple noise to the reference voltage line from the integrated circuits that are driving the data line.

Noise coupling circuit 620 includes a resistor Rdn" 622 which substantially matches Rup' and Rdn' of driver 605. Circuit 620 includes a capacitor 621 which couples Rdn" 622 to reference line 602. The noise in circuit 620 is coupled to reference line 602 when switch 623 is closed and driver 605 is driving data line 601. To allow good noise rejection in the bus, the capacitor needs to be sized such that it allows the lowest frequency noise of interest to couple through. Noise coupling circuits 625 and 630 operate in a similar manner to circuit 620 and need not be described in greater detail.

The reference voltage is supplied to reference line 602 by applying a voltage substantially equal to Vref to the termination resistors. Line 602 will substantially remain at Vref due to the voltage applied to the termination resistors but will also reflect the noise in each of the integrated circuits 650, 660, and 670 when the noise circuits 620, 625, and 630, respectively, couple the noise of each integrated circuit to reference line 602.

While the above description of network 600 only included one data line and one reference voltage line, it should be appreciated that the scope and spirit of the present invention encompass alternative embodiments having different data line and reference voltage line ratios. For example, alternative embodiments may have two or more data lines for each reference voltage line. Additionally, alternative embodiments may have conventional discrete element circuits instead of integrated circuits coupled to the data line(s) and the reference voltage line(s).

Figure 7:
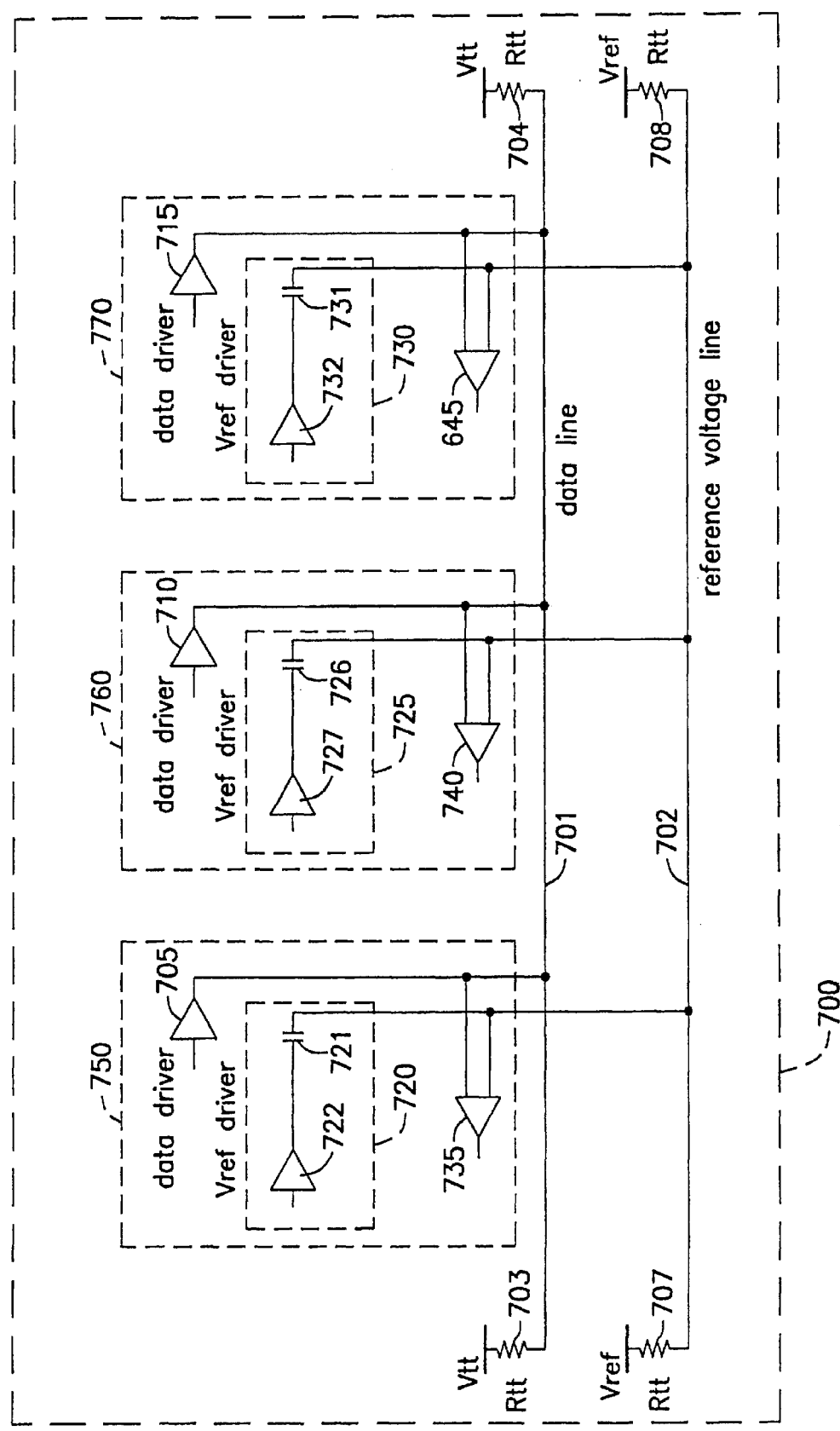
FIG. 7 also illustrates a parallel terminated network for an alternative embodiment in accordance with the present invention.

FIG. 7 illustrates a parallel terminated network for an alternative embodiment in accordance with the present invention. Network 700 includes three separate integrated circuits 750, 760, and 770, each of which has a data driver, a receiver, and a noise coupling circuit. Network 700 includes data drivers 705, 710, and 715, noise coupling circuits 720–730, data line 701, reference voltage line (reference line) 702, data line termination resistors 703 and 704, reference line termination resistors 707 and 708, and receivers 735–745. Network 700 operates and is made in a manner similar to network 600 and need not be described in greater detail, here.

Salient differences between network 700 and network 600 will now be described. For example, instead of placing a resistor and switch in the noise coupling circuit which substantially matches Rup' and Rdn' of the data driver, the noise coupling circuit includes a driver that is substantially similar to the data driver but which is always driven with a constant (high or low) input such that the driver is consistently pulling one end of the capacitor towards (high or low) rail with an impedance matching the data driver impedance. Since the driver in the noise coupling circuit is made to be substantially similar to the data driver it substantially has the same impedance as Rup' or Rdn' of the data driver. Consequently, noise couples in a substantially similar manner to both the data line and the reference voltage line.

Noise coupling circuit 720 includes a driver 722 which has a driver impedance that substantially matches Rup' and Rdn' of driver 705. Circuit 720 includes a capacitor 721 which couples driver 722 to reference line 702. The noise in circuit 720 is coupled to reference line 702 when driver 705 is driving data line 701. When driver 705 is not driving data line 701 driver 722 is tri-stated such that it does not couple noise through capacitor 721 to line 702. Noise coupling circuits 725 and 730 operate in a similar manner to circuit 720 and need not be described in greater detail.

The reference voltage is supplied to reference line 702 by applying a voltage substantially equal to Vref to the termination resistors. Line 702 will substantially remain at Vref due to the voltage applied to the termination resistors but will also reflect the noise in each of the integrated circuits 750, 760, and 770 when the noise circuits 720, 725, and 730, respectively, couple the noise of each integrated circuit to reference line 702.

While the above description of network 700 only included one data line and one reference voltage line, it should be appreciated that the scope and spirit of the present invention encompass alternative embodiments having different data line and reference voltage line ratios. For example, alternative embodiments may have two or more data lines for each reference voltage line. Additionally, alternative embodiments may have conventional discrete element circuits instead of integrated circuits coupled to the data line(s) and the reference voltage line(s).

Given the above description of networks 600 and 700 it should be appreciated that other networks herein may benefit from the noise coupling features of these networks. With regards to network 200 of FIG. 2 it should be appreciated that for an alternative embodiment, some of the Vref drivers can be replaced by either the noise coupling circuits of network 600 of FIG. 6 or the noise coupling circuits of network 700 of FIG. 7. For example, driver 220 can be replaced by either noise coupling circuit 620 or noise coupling circuit 720. With regards to network 400 of FIG. 4 it should be appreciated that for an alternative embodiment, the Vref drivers can be replaced by either the noise coupling circuits of network 600 or the noise coupling circuits of network 700. For example, driver 420 can be replaced by noise coupling circuit 620 or noise coupling circuit 720.

With regards to network 500 of FIG. 4 it should be appreciated that for an alternative embodiment, the Vref drivers can be replaced by either the noise coupling circuits of network 600 or the noise coupling circuits of network 700. For example, driver 520 can be replaced by noise coupling circuit 620 or noise coupling circuit 720.

Noise coupling circuits are defined herein to cover both the Vref drivers of FIGS. 2, 3, 4, and 5, which couple noise as well as generate reference voltages, and the noise coupling circuits which substantially only couple noise.

Thus, a method and apparatus for generating reference voltages has been described. Although the present invention has been described with reference to specific exemplary embodiments, it will be appreciated by one of ordinary skill in the art that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A circuit that is to be coupled to a reference voltage line, comprising:
   a noise coupling circuit that is to couple noise from the circuit to the reference voltage line based upon whether a driver is driving a data line; and
   wherein the reference voltage line is coupled both high and low responsive to the noise.

2. The circuit of claim 1, further comprising:
   a reference voltage keeper that is to maintain a reference voltage on the reference voltage line when the driver is not driving the data line.

3. The circuit of claim 1, wherein the noise coupling circuit is to also produce a reference voltage on the reference voltage line based upon whether the driver is driving the data line.

4. The circuit of claim 1, further comprising the driver.

5. The circuit of claim 1, wherein the noise coupling circuit has a noise circuit impedance that substantially matches a driver impedance of the driver.

6. The circuit of claim 4, further comprising:
   a receiver; and
   wherein the receiver receives signals from the reference voltage line and the data line.

7. The circuit of claim 1, wherein the noise coupling circuit includes a noise driver that is substantially similar to the driver and that is capacitively coupled to the reference voltage line based upon whether the driver is driving the data line.

8. The circuit of claim 1, wherein the noise coupling circuit includes a resistor having a first end that is coupled to ground and a second end that is capacitively coupled to the reference voltage line based upon whether the driver is driving the data line.

9. The circuit of claim 1, wherein the noise coupling circuit includes a voltage divider circuit that is coupled to the reference voltage line based upon whether the driver is driving the data line.

10. A bus, comprising:
    a data line;
    a reference voltage line;
    a first circuit including a first driver and a first noise coupling circuit that is to couple noise from the first circuit to the reference voltage line based upon whether the first driver is driving the data line; and
    wherein the first circuit is coupled to the reference voltage both high and low responsive to the noise.

11. The bus of claim 10, wherein the first noise coupling circuit is to also generate a reference voltage on the reference voltage line when the first noise coupling circuit is coupling noise from the first circuit to the reference voltage line.

12. The bus of claim 10, further comprising:
    a second circuit including a second driver and a second noise coupling circuit that is to couple noise from the second circuit to the reference voltage line based upon whether the second driver is driving the data line.

13. The bus of claim 12, wherein the first driver drives the first data line during a first time period and the second driver drives the data line during a second time period, and the first time period and the second time period do not overlap.

14. The bus of claim 13, wherein the second noise coupling circuit is to also generate a reference voltage on the reference voltage line when the second noise coupling circuit is coupling the noise from the second circuit to the reference voltage line.

15. The bus of claim 14, further comprising:
    a third circuit including a third driver and a third noise coupling circuit that is to couple noise from the third circuit to the reference voltage line based upon whether the third driver is driving the data line.

16. The bus of claim 15, wherein the third driver drives the data line during a third time period that does not overlap with the first time period and the second time period.

17. The bus of claim 16, wherein the third circuit is to also generate a reference voltage on the reference voltage line when the third noise coupling circuit is coupling the noise from the second circuit to the reference voltage line.

18. The bus of claim 17, wherein the first driver has a first driver impedance that substantially matches a first noise circuit impedance of the first noise coupling circuit, the second driver has a second driver impedance that substantially matches a second noise circuit impedance of the second noise coupling circuit, the third driver has a third driver impedance that substantially matches a third noise circuit impedance of the third noise coupling circuit.

19. The bus of claim 10, wherein the first noise coupling circuit has a first noise circuit impedance that substantially matches a first driver impedance of the first driver.

20. The bus of claim 10, wherein the first noise coupling circuit includes a first receiver that receives a reference signal from the reference voltage line and a data signal from the data line.

21. The bus of claim 10, wherein the reference voltage line has a first end and a second end each of which is to receive a reference voltage.

22. The bus of claim 21, further comprising:
    a first voltage divider circuit coupled to the first end and having a first divider circuit impedance that substantially matches a first driver impedance of the first driver;
    a second voltage divider circuit coupled to the second end and having a second divider circuit impedance that substantially matches the first driver impedance.

23. The bus of claim 22, wherein the first end and the second end receive the reference voltage from the first voltage divider circuit and the second voltage divider circuit, respectively.

24. The bus of claim 21, further comprising:
    a first termination resistor coupled to the first end and having a first termination impedance that substantially matches a first driver impedance of the first driver;
    a second termination resistor coupled to the second end and having a second termination impedance that substantially matches the first driver impedance.

25. The bus of claim 24, wherein the first termination resistor and the second termination resistor are to receive a voltage that is larger than the reference voltage.

26. The bus of claim 24, wherein the first termination resistor and the second termination resistor are to receive a voltage that is substantially equal to the reference voltage.

27. A method for communicating signals across a bus, the method comprising:

driving a data line with a first driver in a first circuit;

coupling noise from the first circuit to a reference line based upon whether the first driver is driving the data line; and coupling the reference line voltage magnitude in either direction to match the effect of noise on the data line.

28. The method of claim 27, further comprising applying a reference voltage from a first voltage generator in the first circuit to the reference line when the first driver is driving the data line.

29. The method of claim 27, further comprising applying a reference voltage from a first reference voltage keeper in the first circuit based upon whether the first driver is driving the data line.

30. The method of claim 27, further comprising:

driving the data line with a second driver in a second circuit;

coupling noise from the second circuit to the reference line based upon whether the second driver is driving the data line; and wherein the first driver and the second driver drive the data line during non-overlapping periods of time.

31. A circuit of claim 1, wherein:

the impedance of the noise coupling circuit substantially matches the driver.

32. A circuit of claim 31, wherein:

the impedance of the noise coupling circuit substantially matches the driver when pulling up and pulling down.

33. A circuit of claim 10, wherein:

the impedance of the first noise coupling circuit substantially matches the driver.

34. A circuit of claim 33, wherein:

the impedance of the first noise coupling circuit substantially matches the driver when pulling up and pulling down.

35. A method of claim 27, further comprising:

substantially matching the impedance of the first circuit to the impedance of the first driver.

* * * * *